Oct. 1, 1957 J. A. CONNOR 2,808,546
ADJUSTABLE ELECTRICAL CAPACITOR
Filed March 15, 1954 6 Sheets-Sheet 1
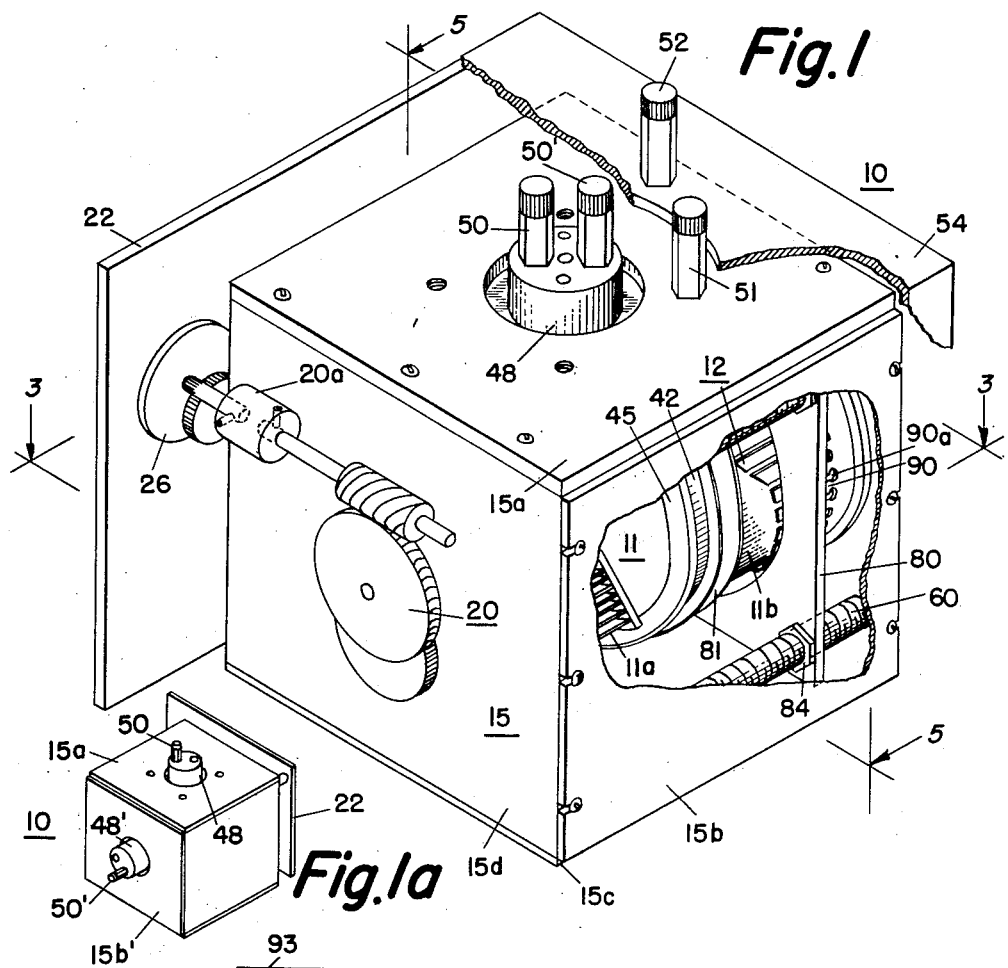
Fig.1
Fig.1a
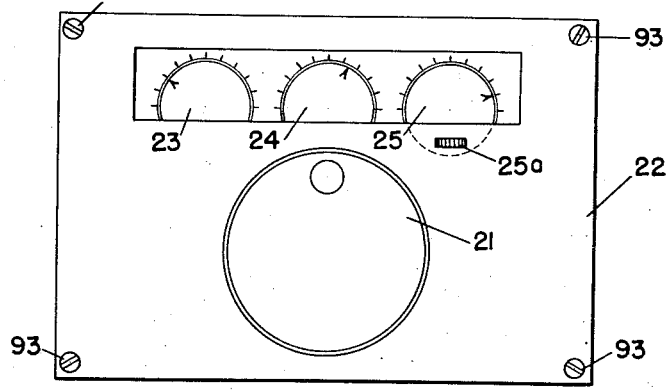
Fig. 2

Oct. 1, 1957 J. A. CONNOR 2,808,546
ADJUSTABLE ELECTRICAL CAPACITOR
Filed March 15, 1954 6 Sheets-Sheet 2

Oct. 1, 1957 J. A. CONNOR 2,808,546
ADJUSTABLE ELECTRICAL CAPACITOR
Filed March 15, 1954 6 Sheets-Sheet 4
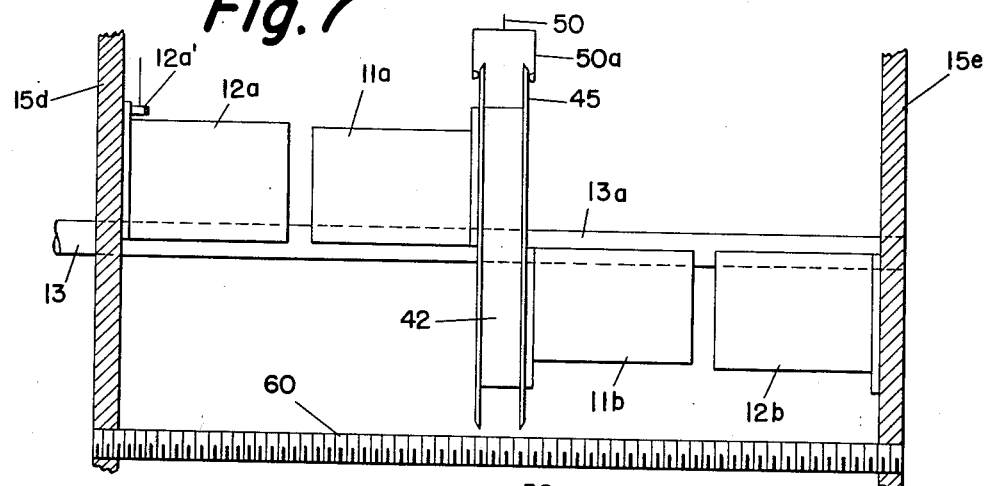
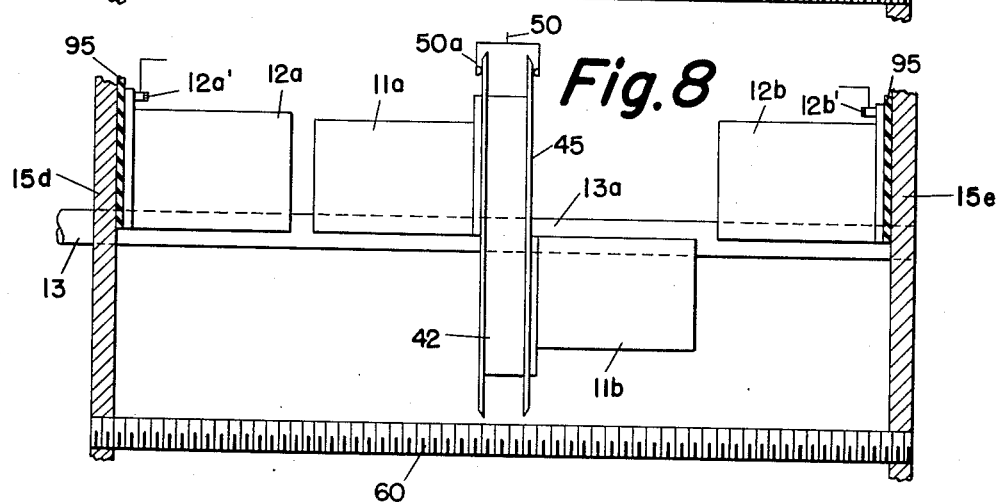
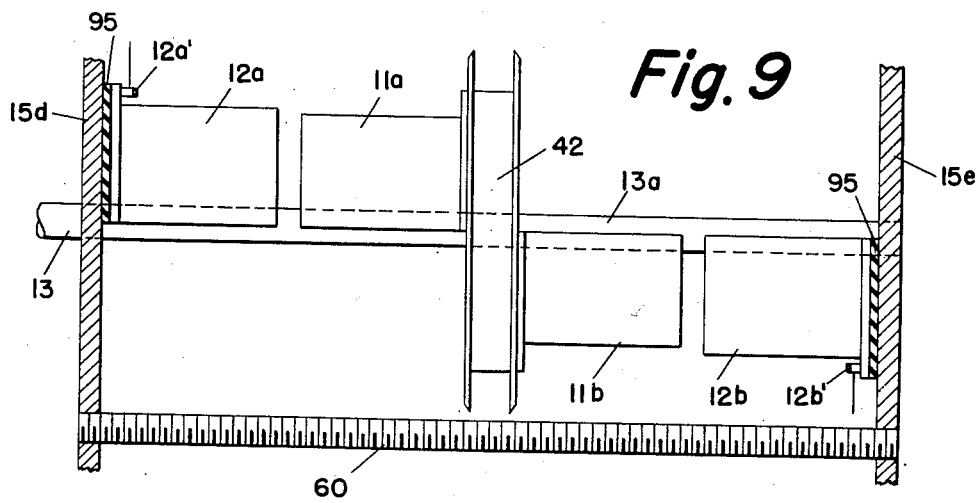

Oct. 1, 1957   J. A. CONNOR   2,808,546
ADJUSTABLE ELECTRICAL CAPACITOR
Filed March 15, 1954   6 Sheets-Sheet 5
*Fig. 10*
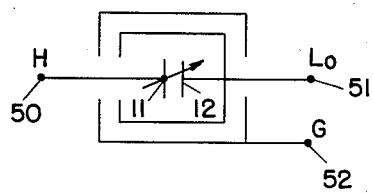
*Fig. 11*
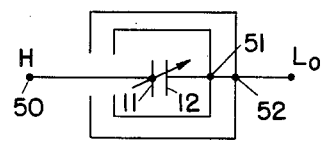
*Fig. 10a*
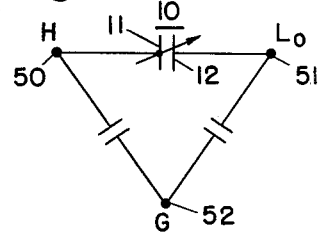
*Fig. 12*
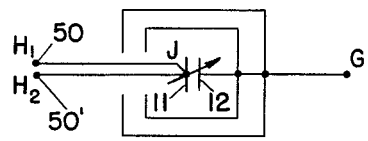
*Fig. 13*
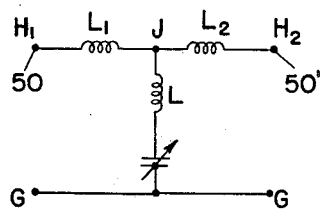
*Fig. 14*
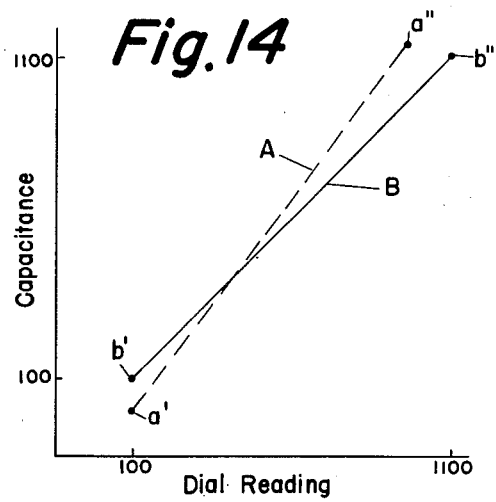
*Fig. 15*
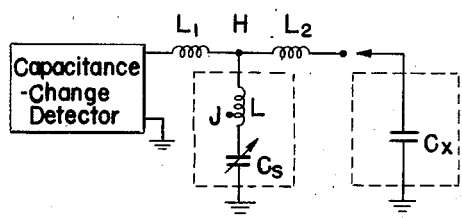
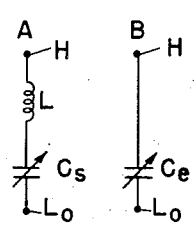
*Fig. 16*

Oct. 1, 1957   J. A. CONNOR   2,808,546
ADJUSTABLE ELECTRICAL CAPACITOR
Filed March 15, 1954   6 Sheets-Sheet 6
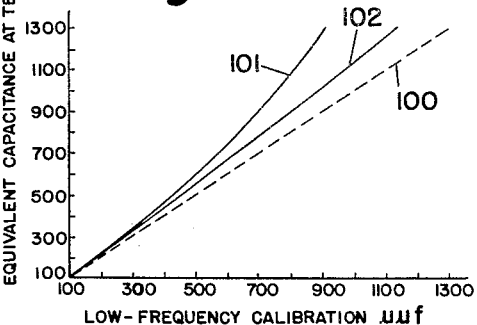
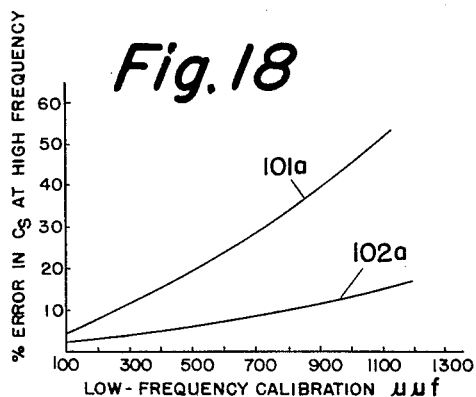
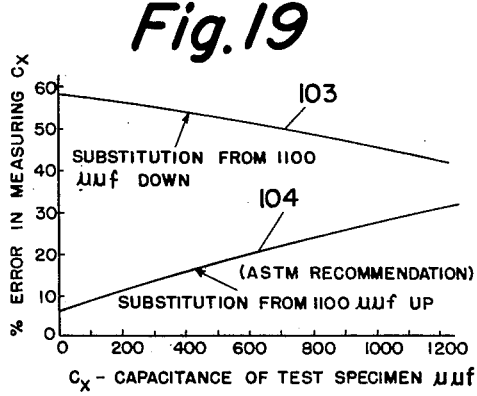
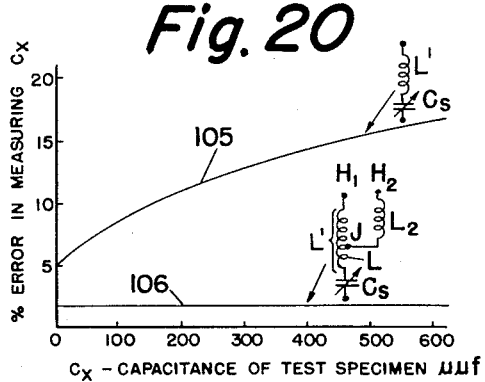
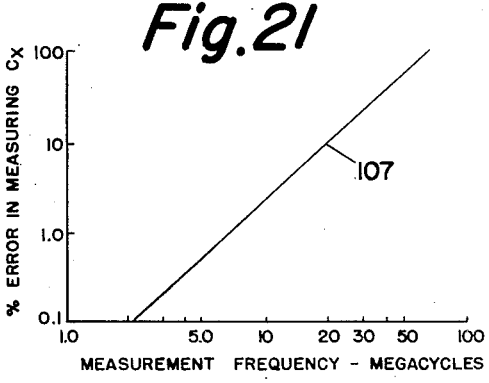

United States Patent Office 2,808,546
Patented Oct. 1, 1957

2,808,546

ADJUSTABLE ELECTRICAL CAPACITOR

John A. Connor, Philadelphia, Pa., assignor to Leeds and Northrup Company, Philadelphia, Pa., a corporation of Pennsylvania Application March 15, 1954, Serial No. 416,149

8 Claims. (Cl. 317—253)

This invention relates to adjustable electrical capacitors of the air dielectric type and has for an object the provision of an adjustable air capacitor of new and improved construction.

The novel construction of this adjustable capacitor in one form provides a rotor for operation at high potential and which is completely enclosed in a case at stator potential. The capacitor electrodes, that is both the rotor and stator, are made up of a plurality of semi-cylindrical plates utilizing a single physical supporting insulator at the axis of rotation of the capacitor in place of a plurality of supporting insulators that are necessary around the external edges of the conventional parallel-plate air capacitor. The novel construction permits placing the supporting insulator in a position of relatively low field strength and therefore reduces the shunt-conductance losses to a point below those normally present in adjustable air capacitors.

In accordance with the present invention there is provided an adjustable air capacitor comprising a rotor and stator each comprising two sections including a plurality of concentric semi-cylindrical plates adapted for intermeshing. The rotor and stator are disposed within a housing and there is provided means for electrically insulating the rotor from the stator and the housing for operation of the rotor at high potential and operation of the stator at low potential.

Further in accordance with the invention, the shaft for the rotor may be formed of insulating material.

In another aspect of the invention there is provided an adjustable air capacitor having a pair of high potential terminals and at least one low potential terminal, the high potential terminals being electrically joined internally of the capacitor housing to form an internal junction.

Further objects and advantages of the invention will be pointed out in connection with the following detailed description taken in conjunction with the accompanying drawings in which:

Fig. 1 is a perspective view, with parts broken away, of an adjustable air capacitor embodying the present invention;

Fig. 1a is a perspective view of the embodiment shown in Fig. 1 but taken from a different angle;

Fig. 2 is a front view of the dial plate of the adjustable air capacitor shown in Figs. 1 and 1a;

Fig. 7 is an exploded diagrammatic view of the embodiment shown in Fig. 1;

Fig. 8 is an exploded diagrammatic view similar to Fig. 7 but with the parts assembled for operation as a differential capacitor;

Fig. 9 is an exploded diagrammatic view similar to Figs. 7 and 8 but with the parts assembled for operation as two capacitors electrically connected in series;

Fig. 10 is a simplified diagram of the capacitor connected for three-terminal operation;

Fig. 10a illustrates the various capacitances between the three terminals in Fig. 10.

Fig. 11 is a simplified diagram of the capacitor connected for two-terminal operation;

Fig. 12 is a simplified diagram of the air capacitor connected for internal junction operation;

Fig. 13 is the equivalent impedance circuit for the internal junction capacitor shown in Fig. 12;

Fig. 14 is a curve useful in explaining one aspect of the invention;

Fig. 15 is a diagrammatic illustration of the parallel substitution method and its application to the present invention;

Fig. 16 illustrates the reactance equivalent circuit of a variable air capacitor; and, Figs. 17–21 are curves useful in explaining the invention.

Figure 3:
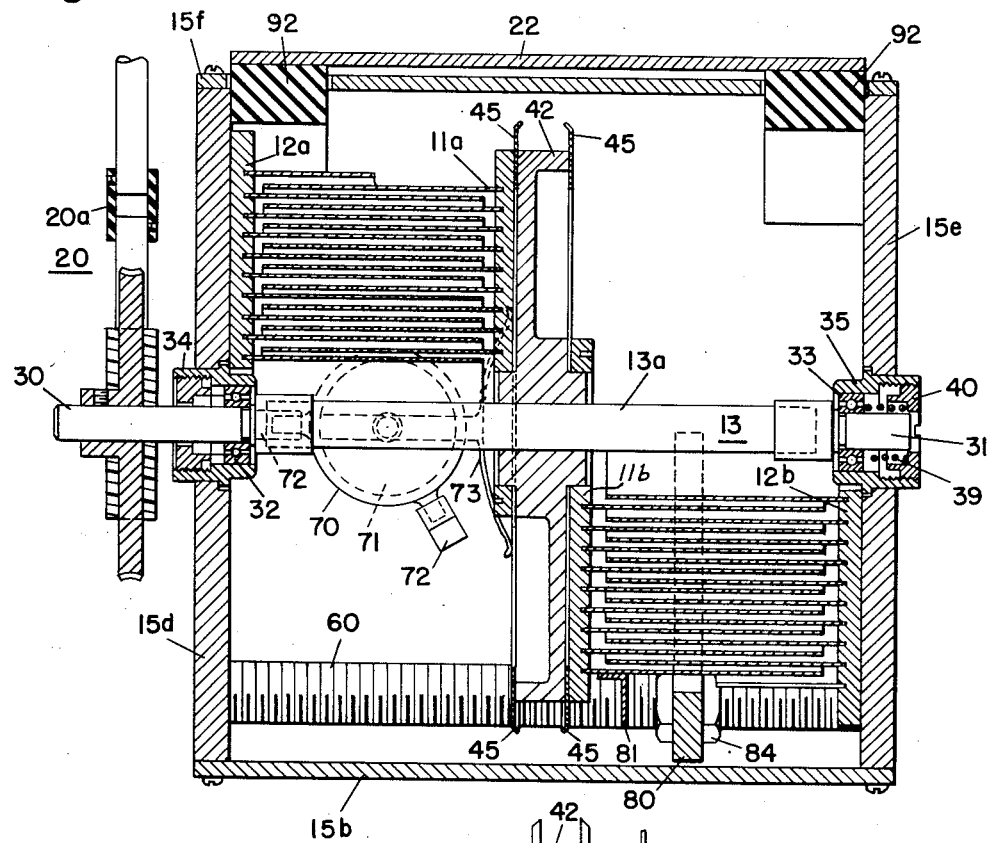
Fig. 3 is a sectional view taken along the plane 3—3 in Fig. 1.

Referring to Fig. 1 there is illustrated an adjustable air capacitor 10 embodying the present invention. The capacitor 10 comprises a rotor 11 and a stator 12 each of which comprises two sections 11a, 11b, and 12a, 12b respectively, Fig. 3. As is readily apparent from Figs. 1, 5 and 6, the plates that make up the rotor 11 and stator 12 are semi-cylindrical in shape. Each of the sections 11a, 11b of the rotor and 12a, 12b of the stator are made up of a plurality of spaced plates, each plate in a section having a different radius, having their longitudinal axes collinear. The rotor sections 11a and 11b are mounted on a central shaft 13 as shown in Figs. 3–6 and the stator sections 12a, 12b are supported from housing 15 with the collinear axes of the stator sections coincident with the axis of the shaft 13 and with the collinear axes of the rotor sections 11a, 11b.

The various plates making up the rotor sections 11a, 11b have a common potential, as do the plates of the stator sections 12a, 12b, and the individual radii of the plates are selected to provide plate-separations sufficient to exhibit any desired total capacitance or capacitance change. Thus, the total capacitance between two interleaving sections of the semi-cylindrical plates may be predetermined by controlling the number of plates, the plate thickness and the value of the minimum plate radius. The approximate capacitance between such electrode sections per unit of axial length may be determined from the following equation:

(1)
$$C_u \cong 0.707 \frac{(N-1)}{t}\left[R_i + \frac{N}{2}(T+t)\right]$$

micromicrofarad/inch where:

$N$ = total number of plates
$t$ = air space between plates (plate separation) in inches
$T$ = thickness of plates in inches
$R_i$ = the inside radius of the inside plate in inches As may be seen from Fig. 1, the housing 15 preferably includes a plurality of plates or panels 15a–15c of equal size, the purpose of which will later be described. The rotor 11 is driven through a suitable gear reducing system 20 from a control knob 21 disposed on control panel 22, Fig. 2. The dials shown on control panel 22 indicate the amount of capacitance corresponding to the particular position of the rotor 11 with respect to stator 12. While numerical values have not been shown on the dials 23—25, the capacitor shown in Fig. 1 may be calibrated to provide a suitable capacitance range, for example, from 100 micromicrofarads ($\mu\mu$f.) to 1100 micromicrofarads. The small adjusting wheel 25a, Fig. 2, cooperates with a friction disk 26, Fig. 1, to provide a micrometer adjustment of capacitor 10.

Figure 4:
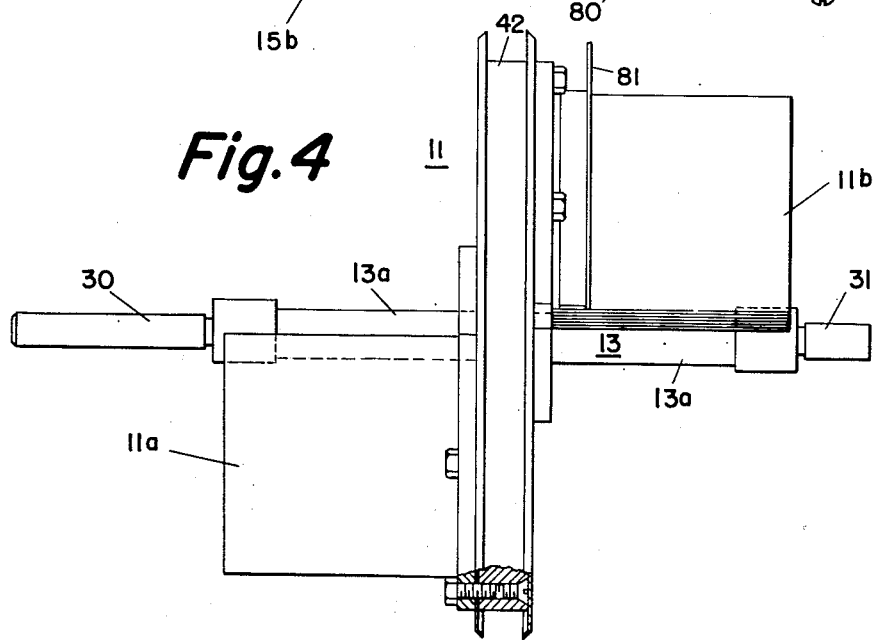
Fig. 4 is a side elevation of the rotor of Fig. 1.

Referring to Figs. 3 and 4, the rotor shaft 13 includes an electrical insulating member 13a at the opposite ends of which are provided metal extensions or journals 30, 31. The extensions 30, 31 are adapted to be disposed in corresponding bearing members 32, 33, the latter being retained by corresponding bearing retainers 34, 35 in opposite end walls 15d, 15e of housing 15, Fig. 3. Bearing 33 is spring loaded by means of a coil spring 39 that surrounds extension 31 and is held under compression between bearing 33 and bearing retainer cap 40. The drive for rotor 11 is supplied by way of adjusting knob 21, Fig. 2, and gear train 20, Figs. 1 and 3, which is connected to the other shaft extension 30 on rotor shaft 13.

Figure 6:
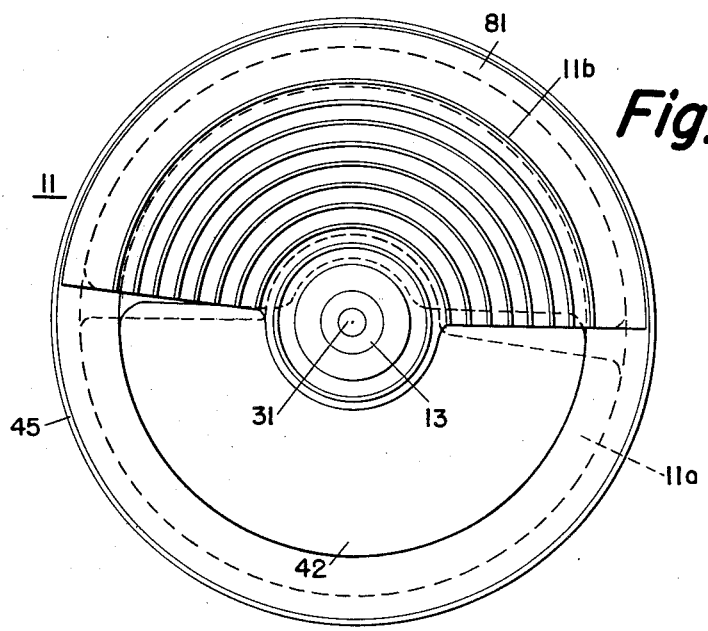
Fig. 6 is an end elevation of the rotor shown in Fig. 4.

A rotor hub 42 is mounted on the insulating portion 13a of shaft 13 intermediate its ends. The hub 42 preferably is formed from a metal casting, the opposite faces of which are adapted to have secured thereto by suitable means the respective rotor sections 11a and 11b. As may be seen in Figs. 3 and 4, the rotor section 11a is supported on the opposite side of hub 42 from section 11b and as shown in Fig. 6, the sections 11a and 11b are angularly displaced from each other approximately 180°. In the particular arrangement illustrated, the rotor plates of each section 11a and 11b include an angle of about 174°.

The stator sections 12a and 12b, like the rotor sections 11a, 11b, comprise a plurality of semi-cylindrical plates electrically interconnected by means of a base plate from which the semi-cylindrical plates extend to form a section. The base plate may be provided with a plurality of concentric semi-circular grooves corresponding to the number of plates to be secured thereto. The plates may be secured to the base plates by any suitable means such as by soldering. The semi-cylindrical plates may be formed by means of cooperating die members that are adapted to bend a plate from its original flat form into the desired semi-cylindrical form of required radius. The rotor plates may be formed in a similar manner and secured to their base plates as above described.

The stator sections 12a, 12b may be secured directly to the end plates 15d and 15e as shown in Figs. 3 and 7. Since the rotor shaft is formed from insulating material 13a such for example, as a ceramic rod, the rotor sections 11a, 11b will both be insulated from the stator sections 12a, 12b and from the housing 15. With this arrangement, the rotor 11 may be operated at high potential and the stator 12 at low potential, the latter having the same potential as the housing 15. It is thus seen that insulating member 13a is positioned in a region of low field strength existing between the rotor 11 and stator 12 and associated parts at corresponding potentials, thereby minimizing the shunt-conductance loss inherent in adjustable air capacitors.

The rotor 11 preferably is provided with spaced contact rings 45 on the periphery of hub 42 to provide a readily accessible high potential contact area internally of the capacitor housing 15. The housing plate 15a, Figs. 1 and 5, includes an insulated high potential terminal 50 including a plurality of spring fingers 50a, Fig. 5, that are disposed in two parallel planes and that are adapted to engage the corresponding spaced contact rings 45. The terminal 50 is supported on a contact plate 48 which is insulated from housing plate 15a by means of an insulating block 49.

To connect the capacitor 10 for three terminal operation, as diagrammatically shown in Fig. 10, there may be provided an exterior housing 54, Fig. 1, adapted to receive housing 15 and normally insulated therefrom. The three terminals will comprise the high potential terminal 50, connected to rotor 11, a low potential terminal 51 electrically connected to stator 12 through inner housing 15 and a ground terminal 52 connected to exterior housing 54. It will be noted that the gear train 20 is insulated from control panel 22 by an insulated coupling 20a.

The capacitor 10 may be electrically connected for two-terminal operation by electrically connecting terminals 51 and 52 as diagrammatically illustrated in Fig. 11.

To connect the capacitor for internal-junction operation as diagrammatically illustrated in Fig. 12, a second high potential terminal 50' may be provided on contact plate 48 of plate 15a, Fig. 1, or the plate 15b which is normally a plain flat plate may be replaced with a plate 15b', Fig. 1a, similar to plate 15a. In the latter arrangement, the high potential terminal 50' may be on contact plate 48' of plate 15b' instead on contact plate 48 of housing plate 15a. The purpose of the internal-junction operation will later be described.

Figure 5:
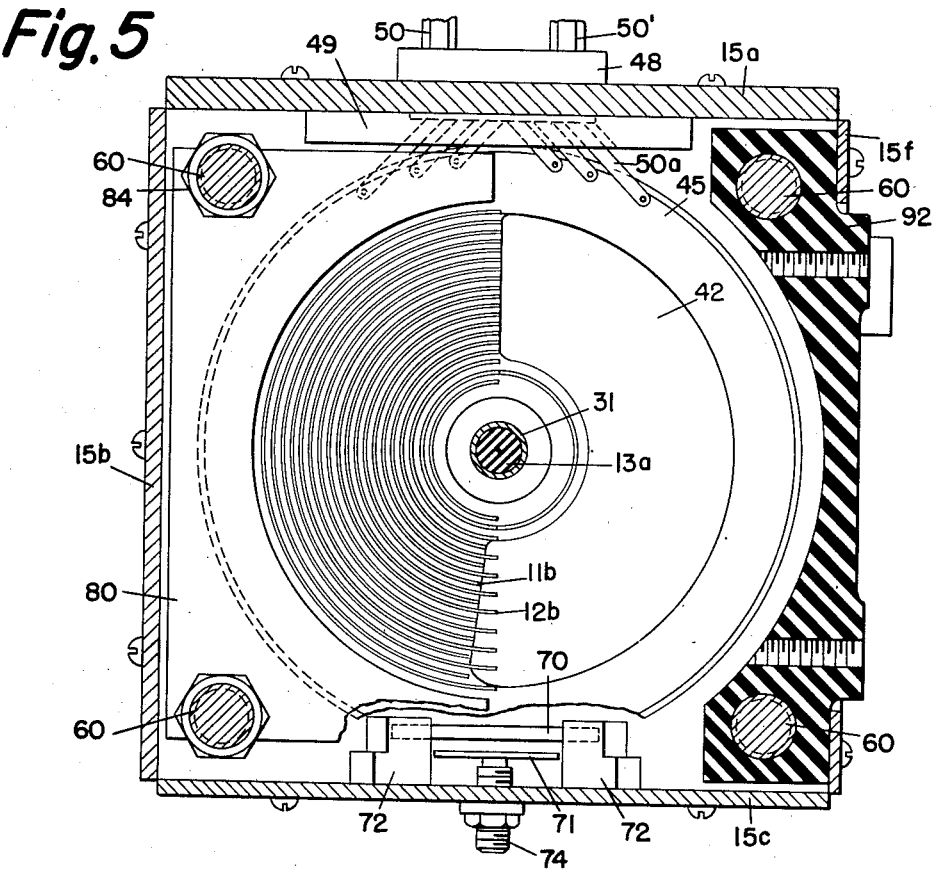
Fig. 5 is a sectional view taken along the plane 5—5 in Fig. 1.

The stator sections 12a, 12b, Fig. 3, are spaced apart axially the proper distance by means of a plurality of connecting rods 60, Fig. 5, the ends of which are secured to the spaced plates 15d, 15e that support the corresponding stator sections 12a, 12b. The semi-cylindrical plates making up the sections of the rotor and stator are preferably made from silver-coated copper. By selecting the type of material from which the rods 60, shaft 13a and the electrode plates are formed, with particular regard to their temperature coefficients of expansion, it is possible to predetermine the temperature coefficient of capacitance of the capacitor over wide limits to provide either a positive or negative coefficient of capacitance as desired. For example, by forming the electrode plates from copper, the shaft from ceramic and using aluminum rods, there will be obtained a temperature coefficient of capacitance of substantially zero. By increasing the coefficient of linear expansion of the supporting rods 60, such as by forming the rods 60 from a material such as magnesium, it is possible to obtain a negative temperature coefficient of capacitance. This results, since the expansion of the magnesium rods tends to pull the plates apart axially faster than if aluminum rods were used. In order to allow for the expansion of the rods 60, it will be noted that bearing 31 for the rotor shaft 13 is spring loaded to compensate for change in spacing between the bearing supporting plates 15d, 15e.

Thus, it will be seen that the temperature coefficient of capacitance of capacitor 10 is a function of the differences in the coefficients of linear expansion of the rods 60, the shaft 13 and the plates of the rotor 11 and stator 12. The foregoing construction is particularly useful where other elements in the measuring circuit have temperature coefficients that require compensation. For example, in bridge circuits resistance elements, with the exception of carbon, normally have positive temperature coefficients. By constructing the capacitor 10 to have a negative temperature coefficient, it is possible to compensate the bridge network such that there will result a zero temperature coefficient for the bridge circuit as a whole. In view of this, there is eliminated the need for making corrections or allowance for the elements in the bridge network that have positive temperature coefficients. It is to be noted that the control provided over the temperature coefficient of capacitance is made possible because of the construction of the stator and rotor sections which permits them to expand axially and such control is not possible in the conventional parallel-plate capacitor construction.

In the case of a precision adjustable capacitor such as capacitor 10, there is provided means for adjusting the capacitance slope as well as the initial capacitance or intercept. The intercept adjustment should preferably be substantially independent of the slope adjustment. For example, referring to Fig. 14, there is illustrated there, a graph with capacitance plotted against dial reading. As previously mentioned, the dial reading may extend over a range of 100 micromicrofarads to 1100 micromicrofarads.

Accordingly, it is necessary that the capacitance of the capacitor agree with the dial reading. Before adjustment of the capacitor let it be assumed that the capacitance varies in accordance with curve A and it will be seen that the ends $a'$ and $a''$ of curve A do not correspond with a capacitance and dial reading of 100 micromicrofarads and a capacitance and dial reading of 1100 micromicrofarads as required. Accordingly, it is necessary to change the slope of curve A as well as the initial capacitance or intercept $a'$ until curve A coincides with curve B, the latter being the correct adjustment for the capacitance slope and intercept of the capacitor.

To accomplish the foregoing, capacitor 10 is provided with an intercept trimmer capacitor including a pair of plates 70 and 71, Figs. 3 and 5, both being supported by housing plate 15c. The inner plate 70 is a stationary plate and is insulated from housing plate 15 by three insulating blocks 72. The outer plate 71 of the intercept capacitor is movable relative to stationary plate 70 and is electrically connected to housing plate 15c through its adjusting screw 74. The stationary plate 70 is provided with a contact spring 73, Fig. 3, the ends of which engage one of the rotor contact rings 45 and electrically interconnect the intercept capacitor therewith. Thus, the intercept capacitor is effectively in parallel with the capacitance derived from stator 12 and rotor 11.

To adjust the intercept capacitor to move curve A upwardly, Fig. 14, to make point $a'$ coincide wtih point $b'$ of curve B, the dial is set at 100 and gear train 20 disconnected from shaft 13. The rotor 11 is then rotated about its axis until the rotor plates and stator plates are in a relative position such that further engagement of the plates produces uniform capacitance change per unit rotation. The gear train 20 is then fixed to shaft 13. Plate 71 is then adjusted relative to plate 70 until points $a'$ and $b'$ coincide. With the intercept $a'$ now coinciding with $b'$, it is necessary to adjust the slope of curve A by rotating curve A about point $a'$ and moving the upper end $a''$ until it coincides with point $b''$ of curve B.

To accomplish the foregoing slope adjustment of curve A, capacitor 10 is provided with a slope trimmer capacitor comprising stator plate 80, Figs. 1, 3 and 5, adjustably carried in stationary position on two of rods 60. The rotor plate 81 of the slope trimmer capacitor is electrically connected to the outer plate of the adjacent rotor section 11b and movable therewith. The slope trimmer capacitor is adjusted with the dial set at 1100, the slope trimmer stator 80 being adjustable along rods 60 relative to rotor plate 81. After the slope trimmer capacitor has been adjusted to change the slope of curve A so that it coincides with curve B, the slope trimmer stator 80 may be secured in position on the corresponding rods 60 as by spaced nut members 84.

In order to achieve the conditions illustrated by curve B, Fig. 14, and have maximum rotation of the rotor while retaining uniform capacitance change, compensating plates 90, Fig. 1, having a plurality of slots 90a and one edge of irregular shape are provided on the stator sections 12a and 12b. The irregular shape of plates 90 is designed to compensate for the non-linear decrease in fringe capacitance between the trailing edges of the rotor plates and the adjacent edges of the stator plates with rotation of the rotor in a direction to increase capacitance. The plates 90 will have a shape similar to that illustrated in Fig. 1 with the length of the fingers in the slotted plate being a function of the reciprocal of the angle of rotation of the rotor.

When the capacitor 10 is to be operated as a three-terminal capacitor, it is necessary to insulate the housing 15 from ground since the stator sections 12a, 12b are electrically connected to the housing 15. Accordingly, there is provided on the pair of rods 60 opposite the pair of rods that support the slope trimmer stator 80 a pair of electrical insulating blocks 92, Figs. 3 and 5, that are adapted to be secured to the dial plate 22, Figs. 1 and 2, to support the housing 15 from the latter. Since the housing 15 is electrically insulated from plate 22 the latter may be disposed in the outer housing 54 and the inner housing 15 will serve as an electrostatic shield between the rotor and outer housing 54. In some applications it is desirable to mount the capacitor 10 on a large control panel. This is accomplished by securing the dial plate 22 to the control panel as by a plurality of screw members 93, Fig. 2. Since the dial plate 22 is insulated from the housing 15 by the insulating blocks 92 and insulating coupling 20a, the housing 15 will likewise be insulated from the main control panel. As previously mentioned, the plates 15a–15c are all of uniform size and since the rotor utilizes circular contact rings 45, the various plates 15a–15c may be readily interchanged with one another to change the location of the terminals. This structural arrangement is particularly advantageous since it permits the leads to the terminals to be kept as short as possible and thus minimizes the inductance in the leads when making high-frequency measurements such, for example, as in A. C. bridge circuits.

The novel construction of the adjustable air capacitor 10 has several other advantages as will now be described. Referring to Fig. 7 there is diagrammatically illustrated in exploded form the normal assembly relation of capacitor 10 as described above in detail. The stator sections 12a, 12b are electrically connected to the end plates 15d and 15e with the end plates being electrically interconnected by way of conducting rods 60 and plates of housing 15a, 15b, 15c, and 15f, Figs. 1 and 3. The rotor sections 11a and 11b are carried by the central hub 42, the latter being carried by the shaft 13 formed of insulating material. Terminal 12a' corresponds to low potential terminal 51 in Fig. 1.

By insulating the stator sections 12a and 12b from each other and then rotating one of these sections a half revolution from the position shown in Fig. 7, the adjustable air capacitor may be changed into a differential type capacitor. Such an arrangement is illustrated diagrammatically in Fig. 8. Stator sections 12a and 12b have been illustrated as insulated from their corresponding supports 15d and 15e as by insulating plate 95. Stator section 12b is shown rotated to a position 180° from its normal position as shown in Fig. 7. With the arrangement as shown in Fig. 8, when rotor 11 is rotated, the plates of rotor section 11b will be brought into meshing relation with the plates of stator section 12b while the plates of rotor section 11a will be moved out of meshing relation with respect to the plates of stator section 12a. In the arrangement illustrated in Fig. 8, it will be noted that each of stator sections 12a and 12b is provided with a terminal 12a' and 12b' respectively. Accordingly, when rotor section 11b and stator section 12b are moved into meshing relation, the capacitance across terminal 12b' and the high potential terminal 50 will change in an increased direction while the capacitance across terminal 50 and terminal 12a' will change in a decreased direction since the plates of the rotor section 11a are moving out of mesh with the corresponding plates of stator section 12a.

By reversing the position of stator section 12b from its position illustrated in Fig. 8 to the position illustrated in Fig. 9 the adjustable capacitor can be transformed into two separate capacitors connected in series. One capacitor will comprise stator section 12a and rotor section 11a and the other capacitor will comprise stator section 12b and rotor section 11b. The rotor sections 11a and 11b will be connected in series electrically by way of the rotor hub 42. In this arrangement, the connections to the series-connected capacitor sections will be made to terminal 12a' and terminal 12b' with no external connection being made to the rotor 42.

As pointed out previously, the capacitor 10 is designed for operation of the rotor 11 at high potential and for operation of the stator 12 at low potential. One of the advantages of this construction is the fact that the capacitor can be changed from a three-terminal capacitor, Fig. 10 to a two-terminal capacitor, Fig. 11, without altering the calibration materially. This may readily be seen by reference to Fig. 10a that illustrates the various capacitances in a three-terminal capacitor. In this arrangement, the direct capacitance is illustrated by electrode members 11 and 12, the rotor member 11 being connected to the high terminal H and the stator member 12 being connected to the low terminal $L_0$. The ground terminal has been identified as G. It will be noted that there is capacitance between terminals G and $L_0$ as well as between terminals G and H. With a capacitor constructed in accordance with the present invention, the capacitance between terminals G and $L_0$ will be high whereas the capacitance between terminals H and G will be low both of these capacitances being in series with each other and the series combination being in parallel with the direct capacitance of electrodes 11 and 12. Accordingly, when converting the capacitor from a three-terminal capacitor to a two-terminal capacitor, the capacitance between terminals G and $L_0$ will be shorted-out and thus, only the capacitance between terminals H and G will in effect be electrically connected in parallel with the capacitor comprising rotor 11 and stator 12. Since the capacitance between terminals H and G is substantially the same as the series combination, the shorting of the capacitance between G and $L_0$ has substantially no effect on the calibration of the instrument. This is in contrast to prior art arrangements wherein the rotor is usually operated at low potential and the stator operated at high potential. With that arrangement, when change is made from three-terminal to two-terminal operation, the high capacitance remains in parallel with the direct capacitance and the low capacitance is shorted-out. Thus, there is a substantial change in the total capacitance of the capacitor and necessitates changing the calibration.

As earlier mentioned, the capacitor 10 may be provided with a second high potential terminal 50' for operation of the capacitor as an internal-junction capacitor. With this arrangement the capacitor 10 will have two high potential terminals 50, 50' connected internally of the capacitor housing 15 to a common junction on rotor 11 since the contact fingers of the terminals will engage the contact rings 45 on rotor hub 42. This construction is particularly desirable when capacitor 10 is being used for measuring unknown capacitance by the parallel-substitution method, Fig. 15 now to be described.

Precision impedance measurements at radio frequencies are dependent upon fixed resistors and variable air capacitors as the most reliable measurement standards. These circuit elements have been combined in bridge and resonant circuits to provide instrumentation with sufficient precision for many studies of important electrical properties. However, the limitations inherent in fixed R. F. resistors and variable air capacitors can still cause an error factor of considerable importance in some of the most fundamental material evaluations of electro-chemistry. The valid application of precision air capacitors at even moderately high radio frequencies depends greatly upon the ability to "extrapolate" low frequency calibration data to measurements made at far higher frequencies. Thus, a typical problem may require the extension of a one kilocycle calibration for use in a five megacycle measurement. Problems of this nature are commonly encountered and require the application of precisely determined residual parameters or a discontinuance of use of a given standard when the errors exceed a predetermined limit. In either case, a severe restriction is imposed upon the "best available" measurement standard.

Accordingly, it is an object of this invention to provide a capacitor circuit to greatly reduce the errors introduced by the inherent residual series inductance of precision air capacitors whereby the range of precision impedance measurement may be carried further into the high radio frequency region.

Precision air capacitors used as calibrated standards may provide a nominal capacitance range from 100 micromicrofarads to 1100 micromicrofarads. The reactance equivalent circuit of a conventional two-terminal unit is illustrated in Fig. 16. The expression for the impedance of Z of circuit A may be written as follows:

$$Z = j\omega L + \frac{1}{j\omega C_s}$$

where:

L is series inductance
$C_s$ is standard series capacitance
$\omega = 2\pi f$
$f$ = frequency of test.

In circuit B the inductance has been combined with the standard capacitance and the impedance Z' is represented by the equation.

$$Z' = \frac{1}{j\omega C_e}$$

where:

$C_e$ is the effective capacitance of the circuit.

When $Z = Z'$ then $$C_e = \frac{C_s}{1 - \omega^2 L C_s}$$

Thus, the effect of a finite inductance in series with a known capacitance increases the effective capacitance appearing at the terminals.

The inductive effects upon a calibrated capacitor at a nominal frequency of ten megacycles and for two different series inductances is illustrated by the curves in Fig. 17. The ideal curve is represented by curve 100, and curve 101 represents the effect of an inductance where $L = 0.08$ microhenry and curve 102 illustrates the inductive effects where $L = 0.03$ microhenry. From Fig. 17 it is clear that by reducing the inductance by a factor of ½ or greater as illustrated by curves 101 and 102, it is possible to substantially reduce the amount of capacitance error. This fact may be further seen in connection with Fig. 18 where the capacitance error has been plotted against capacitance setting with curve 101a representing a residual inductance of 0.08 microhenry and curve 102a representing a residual inductance of 0.03 microhenry.

Since the most common techniques used to measure capacitance at radio frequencies are based upon substitution procedures, the appreciable capacitance error that normally is included in the absolute calibration of a standard air capacitor can introduce comparably large absolute errors in capacitance measurements.

From the diagrammatic illustration of the parallel-substitution circuit shown in Fig. 15, it will be seen that the terminal H is the common junction of the three inductances, L, $L_1$, and $L_2$ and thus is the essential capacitance-reference point, and the substitution of the test specimen capacitance $C_x$ is to be compensated for by a reduction of standard capacitance of $C_s$ until the capacitance from H to ground is restored. Thus, the inductance of the detector connecting lead $L_1$ does not enter into the capacitance-substitution relationship and $L_1$ may be considered as part of the detector. The inductance of the specimen lead $L_2$ acts to make the specimen capacitance $C_x$ appear higher than in reality. On the other hand, residual inductance L of the standard capacitor will magnify changes in standard capacitance $C_s$, thus making the specimen capacitance $C_x$ appear smaller than in reality.

For purposes of analysis temporarily let the inductance of $L_2$ be assumed negligible. Thus, $C_x$ in effect is shunted across $C_s$ in series with L. Two procedures may now be used. In the first procedure with $C_s$ at its maximum value there may be established a datum observation of the detector. $C_x$ may now be connected in parallel into the circuit with $C_x$ being read as the decrement of $C_s$. In the second procedure with $C_s$ at its minimum value and $C_x$ connected across the standard capacitor a datum observation of the detector may be established. The specimen capacitance $C_x$ may then be removed and $C_x$ read as the increment of $C_s$. If the residual inductance $L$ were zero these two substitution methods would result in the same answer at all frequencies. However, with a finite residual inductance $L$, each of the two methods gives an erroneous result with a wide difference in the magnitudes of these inherent errors. A specific example of the comparative error magnitudes involved in these two substitution techniques is illustrated in Fig. 19 respectively by curves 103 and 104 where $L=0.08$ microhenry and the measurement frequency $f=10$ megacycles. These errors are approximately proportional to the magnitude of the series inductance $L$ and the square of the measurement frequency. The error in the specimen capacitance $C_x$ resulting from series inductance $L_2$ is in the opposite sense of the error in the specimen capacitance $C_x$ due to the series inductance $L$. The expression for the magnitude of the error $C_x$ is in the same form as is the error in the absolute value of $C_s$. In view of the foregoing, it will be seen that there is a partial nullification of the effects of one series inductance by the other. However, when the inductance $L_2$ which is in series with a substitution terminal is considered, the original capacitance standard is no longer a simple two-terminal network of the type indicated by network A in Fig. 16.

In accordance with the present invention, the common junction point appearing at terminal H, Fig. 15, is moved to a location J within the confines of the capacitor housing, Fig. 12, to reduce the value of inductance $L$ to a minimum. The inductance $L_2$ will now be connected to J and thus the capacitor may properly be referred to as an internal-junction capacitance standard. The internal-junction capacitor is a form of a four-terminal impedance standard, Fig. 13, and although there normally are only three accessible terminals, Fig. 12, it is to be distinguished from any of the various forms of ordinary three-terminal capacitors, such as illustrated in Fig. 10. It is to be noted that the "twin high-terminal" design of the present invention can also be applied to the ordinary three-terminal construction of Fig. 10 as well as the two-terminal construction of Fig. 11.

Referring to Figs. 12 and 13, the terminals $H_1$ and G form a pair of current terminals and the terminals $H_2$ and G form a pair of potential terminals. The effect of $L_1$, Fig. 13, is thus eliminated from the measurements as previously described and as now will be pointed out considerable advantage is obtained in reducing the value of $L$ even at the expense of some increase in $L_1$ and $L_2$ since such reduction will reduce the overall measurement error. Since the effect of $L_1$ has been eliminated there remains for consideration only the magnitudes of $L$ and $L_2$, the values of which should be such as to minimize further the errors involved in measuring an unknown capacitance by means of parallel-substitution.

In making a parallel-substitution measurement, Fig. 15, the comparison criterion is the reestablishment of a reference capacitance from the junction to ground. This provides the equality of the following Equation 2. The equivalent capacitance of the unknown is given by the right-hand side of Equation 2. This is determined in the parallel-substitution method by a change in equivalent capacitance of the standard as indicated by the left-hand side of Equation 2.

(2) $$\frac{\Delta C_s}{(1-\omega^2 L C_{s1})(1-\omega^2 L C_{s2})} = \frac{C_x}{1-\omega^2 L_2 C_x}$$

where:

$\Delta C_s$ is the difference between $C_{s1}$ and $C_{s2}$,
$C_{s1}$ is the initial capacitance setting, and
$C_{s2}$ is the final capacitance setting.

Equation 2 may be simplified to a form suitable for evaluating the relative effects of $L$ and $L_2$ in producing error. The equation in such form reads as follows:

(3) $$C_x \cong \frac{\Delta C_s}{1-\omega^2[L(C_{s1}+C_{s2})-L_2(C_{s2}-C_{s1})]}$$

If $L$ and $L^2$ are made equal Equation 3 may be further simplified as follows:

(4) $$C_x \cong \frac{\Delta C_s}{1-\underbrace{2\omega^2 L C_{s1}}_{\text{Error Term}}}$$

It will be noted that when $L$ and $L_2$ are equal the error term of Equation 4 above is independent of the final capacitance setting $C_{s2}$ and the error in measurement will be independent of $C_x$. As a result this error is a constant characteristic of the standard capacitor at any one frequency. The reduction of this error depends upon the reduction of inductance $L$. The value of this inductance has been reduced by the present invention to that located in the capacitor structure beyond the internal junction J. By locating the junction J internally of the capacitor housing in accordance with the present invention there is provided means for maximum reduction of the effective residual series inductance $L$ to that inherent in the capacitor structure itself. The arrangement of semi-cylindrical plates with their corresponding ends connected to the central hub affords the minimum residual inductance of the high potential electrode structure. A substantial reduction of inductance $L$ is obtained for the stacked parallel flat plate construction by locating the internal junction at the one end of the stack. In this latter construction the effective residual inductance is reduced to that inherent in the capacitor stack itself.

Referring to Fig. 20 there is illustrated a typical error reduction attained in accordance with the present invention over capacitance measurement of dielectric test specimens made in accordance with prior practices. Curve 105 illustrates that a conventional two-terminal capacitance standard provides its minimum errors when substitutions are made according to the A. S. T. M. recommended technique, i. e., from the lowest value up. Curve 106 illustrates the errors incurred when measurements are made in accordance with the present invention by providing a separate current terminal $H_1$ and making the capacitance substitution across the potential terminals $H_2$ and ground G as shown in Figs. 12 and 13. From the comparisons of curve 105—106 it will be seen that substantial error reductions are obtained with this invention and in some cases may be as great as ten to one. It is to be observed that curve 105 is obtained by using the prior art capacitors under the most advantageous conditions. If a 600 micromicrofarad unknown were measured by substituting from 1100 micromicrofarads down (at ten megacycles) an error of 33% would be incurred. This error can be compared with an error of 18% for substitutions from 100 micromicrofarads up as indicated on curve 105 and an error of 1.9% for measurements made in accordance with the present invention utilizing the internal-junction capacitance standard as indicated by curve 106.

Curve 105 is exemplary of data obtained with a conventional two-terminal capacitor having a series inductance $L'$ of 0.063 microhenry, Fig. 20. Curve 106 is exemplary of data obtained in accordance with the present invention with an internal-junction capacitor having an inductance $L'$ of 0.063 microhenry and inductances $L_2$ and $L$ each equal to 0.020 microhenry. Both tests were conducted at a frequency of ten megacycles.

The constancy of measurement error at any frequency allows the simplification of "error quotation" inherent in R. F. capacitance measurements by means of parallel-substitution. The potential extended frequency application of the internal-junction capacitance standard of the present invention is illustrated in Fig. 21. Curve 107 indicates the values of error to be expected in measuring any specimen capacitor with values less than 1000 micromicrofarads and for a wide range of frequencies. Ase previously pointed out capacitor 10 is readily adaptable to a capacitor of the internal junction type, the internal junction being at contact rings 45 on hub 42 of the rotor.

It will be understood the invention is not limited to the specific arrangements shown and that changes and modifications may be made within the scope of the appended claims.

What is claimed is:

1. An adjustable air capacitor comprising a rotor and a stator, said rotor and stator each including a plurality of concentric semi-cylindrical plates adapted for intermeshing, a housing for said rotor and said stator, means for insulating said rotor from said stator and said housing for operation of said rotor at high potential and operation of said stator at low potential, an outer housing for said capacitor adapted for operation at ground potential, each of said stator, said rotor and said outer housing having a terminal electrically connected thereto, the capacitance between the terminals of said outer housing and said stator being high whereas the capacitance between the terminals of said rotor and said outer housing are low with both of these capacitances being in series with each other and the series combination in parallel with the direct capacitance of said rotor and said stator, and means for converting said capacitor from a three-terminal capacitor to a two-terminal capacitor by shorting the terminals of said outer housing and said stator so that only the capacitance between the terminals of said rotor and said outer housing will in effect be electrically connected in parallel with said direct capacitance of said rotor and said stator, the capacitance between the terminals of said rotor and said outer housing being substantially the same as said series combination whereby the shorting of the capacitance between the terminals of said outer housing and said stator has substantially no effect on the calibration of said air capacitor.

2. An adjustable air capacitor comprising a rotor and a stator, said rotor and stator each comprising two sections including a plurality of concentric semi-cylindrical plates adapted for intermeshing, said rotor having an electrical contact area extending around the axis thereof, a housing for said rotor and said stator, means for insulating said rotor from said stator and said housing for operation of said rotor at high potential and operation of said stator at low potential, said housing comprising a plurality of interchangeable side panels of equal size disposed around the axis of said rotor, and two of said side panels including flexible contact means projecting inwardly therefrom and engaging said electrical contact area on said rotor to form within said housing a high potential junction for said capacitor, and electrical terminal means on each of said two side panels.

3. An adjustable air capacitor comprising a rotor and a stator, said rotor and stator each comprising two sections including a plurality of concentric semi-cylindrical plates adapted for intermeshing, a housing for said rotor and said stator, means for insulating said rotor from said stator and said housing for operation of said rotor at high potential and operation of said stator at low potential, said stator sections being interconnected electrically by a plurality of rods parallel to the axis of said rotor, said capacitor having adjustable capacitance with rotation of said rotor, and means for changing the rate of change of capacity of said capacitor with rotation of said rotor, said last-named means comprising a flat plate member carried by and electrically connected to the outermost semi-cylindrical plate of one of said sections of said rotor, said flat plate member being coextensive in angular extent with said outermost rotor plate, and another flat plate member of corresponding length supported on said rods in parallel spaced relation to said first-named flat plate member and electrically connected to a corresponding one of said sections of said stator, and means for adjusting one of said flat plate members relative to the other to predetermine the parallel spacing therebetween.

4. An adjustable air capacitor comprising a rotor and a stator, said rotor and stator each comprising a plurality of equally spaced plates adapted for intermeshing, an inner housing for said rotor and said stator, means for insulating said rotor from said stator and said inner housing for operation of said rotor at high potential and operation of said stator at low potential, an outer housing within which are disposed said inner housing and said rotor and said stator, said inner housing serving as an electrostatic shield for said rotor and stator, means for normally electrically insulating said outer housing from said inner housing for operation of said air capacitor as a three-terminal capacitor, and means for selectively electrically connecting said stator and said outer housing to provide for operation of said air capacitor as either a two-terminal capacitor or a three-terminal capacitor without affecting the calibration of said air capacitor.

5. An adjustable air capacitor comprising a rotor and a stator, said rotor and stator each comprising two sections including a plurality of concentric semi-cylindrical plates adapted for intermeshing, an inner housing for said rotor and said stator, means for insulating said rotor from said stator and said inner housing for operation of said rotor at high potential and operation of said stator at low potential, an outer housing within which is disposed said inner housing and said rotor and said stator, said inner housing serving as an electrostatic shield for said rotor and said stator, means for normally electrically insulating said outer housing from said inner housing for operation of said air capacitor as a three-terminal capacitor, and means for selectively electrically interconnecting said stator and said outer housing for operation of said air capacitor as a two-terminal capacitor without affecting the calibration of said air capacitor.

6. An adjustable air capacitor comprising a rotor and a stator, said rotor and stator each comprising two sections including a plurality of concentric semi-cylindrical plates adapted for intermeshing, a housing for said rotor and said stator, means for insulating said rotor from said stator and said housing for operation of said rotor at high potential and operation of said stator at low potential, said rotor sections being electrically interconnected by a support having a circular rotor contact member disposed between said rotor sections, and a pair of high potential terminals having common contact means for engaging said rotor contact member to provide a common junction point for said high potential terminals within said housing to minimize the residual series inductance of said capacitor whereby said capacitor forms an internal-junction capacitance standard with one of said terminals of said pair forming a current terminal and the other forming a potential terminal.

7. An adjustable air capacitor comprising a rotor and a stator, said rotor and stator each comprising two sections including a plurality of concentric semi-cylindrical plates adapted for intermeshing, a shaft for said rotor having a hub disposed intermediate the ends of said shaft, said rotor sections being mounted on opposite sides of said hub, and contact means engaging said hub in a region adjacent the outermost of said semi-cylindrical capacitor plates of said rotor to shorten the average current path for minimizing the effective series inductance of said rotor.

8. An adjustable air capacitor comprising a rotor and a stator, said rotor and stator each including a plurality of concentric semi-cylindrical plates adapted for intermeshing, said capacitor having adjustable capacitance with rotation of said rotor, the outermost of said semi-cylindrical plates of said stator having a plurality of slots and a circumferential edge of irregular shape to compensate for the non-linear decrease in fringe capacitance between the trailing edges of the rotor plates and the adjacent edges of the stator plates with rotation of the rotor in a direction to increase capacitance to permit maximum rotation of the rotor while retaining uniform capacitance change, the length of the fingers formed by the slots in said plate being a function of the reciprocal of the angle of rotation of said rotor, means for changing the rate of change of capacity of said capacitor with rotation of said rotor, said last-named means comprising a plate member electrically connected to said stator and extending outwardly of said semi-cylindrical plates of said stator, a second plate member carried by said rotor and extending outwardly of said semi-cylindrical plates of said rotor and parallel to the other said plate member, and means for adjusting one of said plate members relative to the other to vary the parallel spacing therebetween.

References Cited in the file of this patent

UNITED STATES PATENTS

| | | |
|---|---|---|
| 1,626,526 | Gillen | Apr. 26, 1927 |
| 1,686,814 | Ide | Oct. 9, 1928 |
| 1,750,393 | Dubilier | Mar. 11, 1930 |
| 1,840,298 | Andrewes | Jan. 12, 1932 |
| 2,135,017 | Sharland | Nov. 1, 1938 |
| 2,273,522 | Horowitz | Feb. 17, 1942 |
| 2,400,112 | Greibach | May 14, 1946 |
| 2,449,577 | Bailey | Sept. 21, 1948 |
| 2,477,635 | Marchand | Aug. 2, 1949 |
| 2,617,859 | Kraft | Nov. 11, 1952 |
| 2,659,039 | Bourgonnier | Nov. 10, 1953 |

FOREIGN PATENTS

| | | |
|---|---|---|
| 357,096 | Great Britain | Sept. 14, 1931 |
| 591,063 | Germany | Jan. 16, 1934 |
| 662,656 | Germany | July 18, 1938 |
| 595,895 | Great Britain | Dec. 17, 1947 |
| 957,625 | France | Oct. 29, 1949 |